Nov. 30, 1965    A. R. KRIEBEL    3,220,261
METHOD OF DETERMINING THE LOADING OR MEAN PARTICLE
RADIUS OF A FLUID CARRYING PARTICULATE MATERIAL
Filed June 12, 1962    2 Sheets-Sheet 2

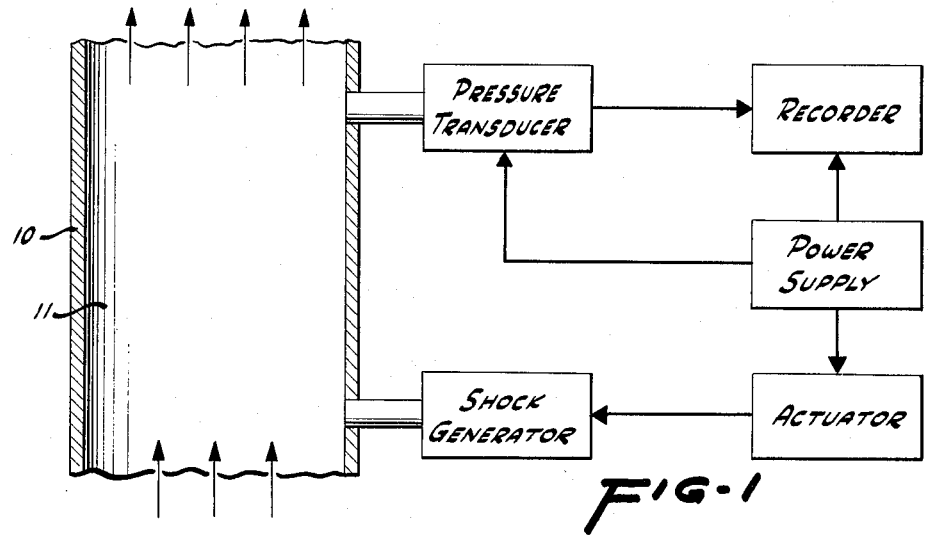
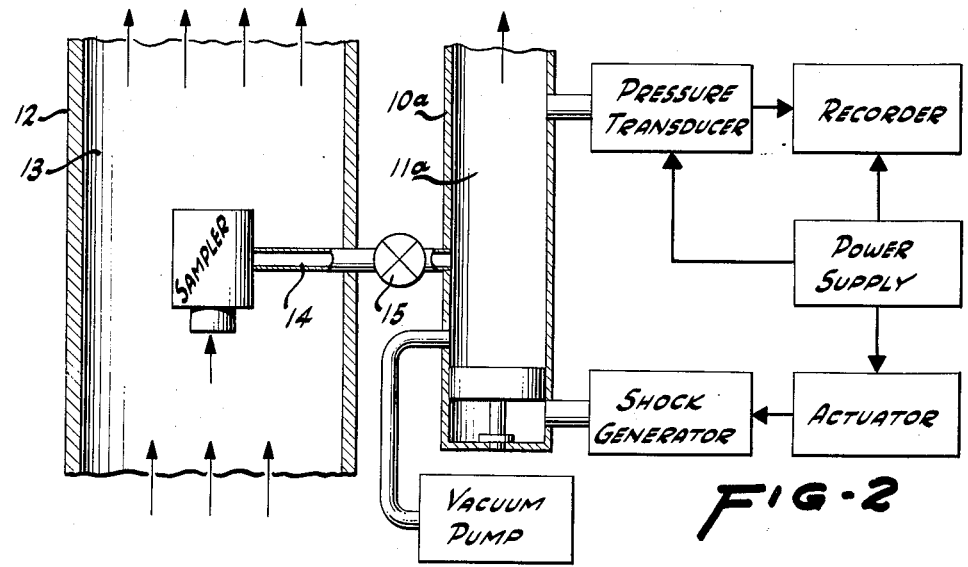
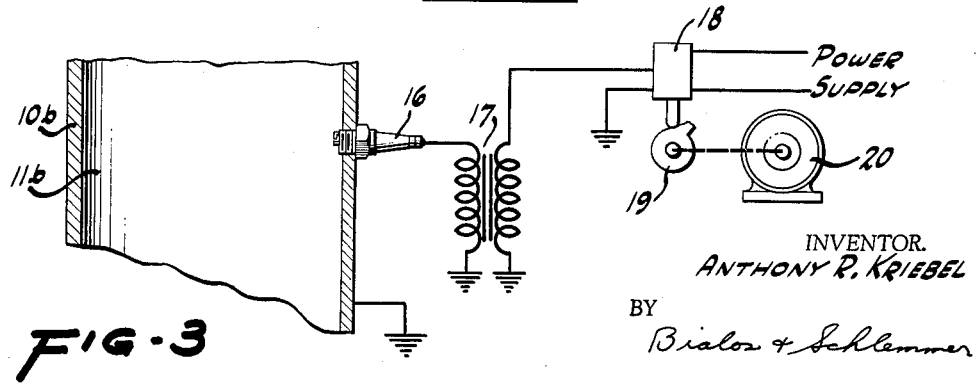

INVENTOR.
ANTHONY R. KRIEBEL
BY
Bialos & Schlemmer
ATTORNEYS

United States Patent Office
3,220,261
Patented Nov. 30, 1965

3,220,261
METHOD OF DETERMINING THE LOADING OR MEAN PARTICLE RADIUS OF A FLUID CARRYING PARTICULATE MATERIAL
Anthony R. Kriebel, Menlo Park, Calif., assignor to Itek Corporation, a corporation of Delaware
Filed June 12, 1962, Ser. No. 201,928
3 Claims. (Cl. 73—432)

This invention relates to a method of determining the size, density, or both size and density of particulate matter dispersed in a fluid medium.

In many environments it is either necessary or advantageous to determine the size and/or density of particles contained in a fluid medium. For example, determinations of such type are advantageously made in connection with the flow of particle-laden gases in smoke-stacks, in connection with catalytic crackers for petroleum products, for certain paper-pulp slurry and mineral slurry measurements, and even in connection with many mixtures in which the ratio of particles to fluid is several hundred to one. Such determinations have been practicably made heretofore only by collecting samples of the fluid-particle mixture, removing the particles from such mixture and then analyzing the same either microscopically, by impactor-type particle analyzers, by light or sound attenuation, or by other standard techniques. However, even with such elaborate procedures, the size and density of the particles could not be determined accurately because of the shattering, agglomeration or deglomeration of the particles which often occurred in obtaining such samples, especially when taken from a flowing stream.

Accordingly, an object of the present invention is to provide an improved method of determining the size or mass mean diameter, the amount or density, or both, of solid or liquid particles dispersed in a fluid medium, whether gaseous or liquid as the appropriate case may be. Another object of the invention is in the provision of an improved method of determining either or both the mass mean diameter and density of particles dispersed in a fluid medium contained within a chamber while such medium remains therein, or dispersed in a fluid flow stream without interrupting or otherwise interfering with the continuity of the flow thereof and without collecting or taking samples therefrom for analysis.

A further object is to provide a system having, among others, the foregoing advantages and which utilizes the propagation of a shock wave in such fluid medium and certain measured properties of the propagated wave as the basis from which the size, the density, or both, of the particles dispersed in such fluid medium are determined. Additional objects and advantages of the invention will become apparent as the specification develops.

Embodiments of the invention are illustrated in the accompanying drawings, in which—

FIGURE 1 is essentially a block diagram illustrating a system embodying the invention;

FIGURE 2 is essentially a block diagram showing a modified system;

FIGURE 3 is a largely diagrammatic view illustrating an electric shock generator;

Figure 4:
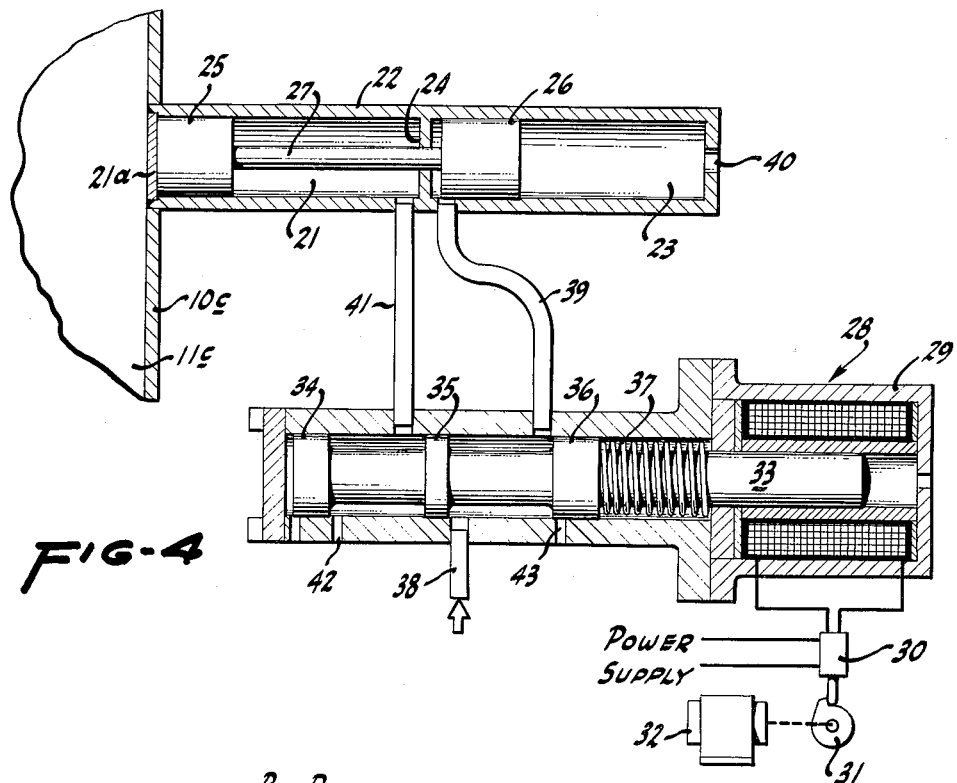
FIGURE 4 is a broken transverse sectional view showing a mechanical shock generator.

Prior to discussing the theoretical aspects of the invention and analyzing the same in terms of mathematical considerations, a description of specific embodiments of the invention will be set forth, for from such bases, further discussion will be facilitated. Referring then to FIGURE 1, a structure is shown which includes a casing 10 providing a chamber 11 adapted to contain a mixture defined by a fluid medium having particles dispersed therein. The casing shown is a conduit adapted to have such mixture flow therethrough in the direction indicated by the arrows. The flow conduit might be a smokestack, for example, in which event the fluid medium would be gaseous and the particles usually solids although in certain instances they could be liquid.

Connected with the casing 10 is a shock generator adapted to impart a shock wave to the mixture within the chamber 11. The shock generator may take various forms, as will be described hereinafter, but in each instance the shock wave imparted to the mixture is a pressure wave or pressure disturbance which is propagated toward a pressure transducer associated with the casing 10 and chamber 11 so as to measure the amplitude of the pressure wave. The pressure transducer may be of any suitable commercially available type capable of measuring a rapidly varying pressure and developing an output signal proportional thereto. In the form suggested in the drawings, such signal will be electrical.

In the embodiment of FIGURE 1, the pressure transducer is located with respect to the shock generator so that the shock waves propagated in the mixture approximate or attain a steady state when the pressures thereof are sensed by the transducer. Such relationship between the shock generator and pressure transducer is advantageous in that it permits accurate determination of the pressure or shock wave form which is used in determining the size and density of the particulate matter dispersed in the fluid medium. It is not essential, however, that the peak value of the wave form be measured, since the wave form can be determined from measurement of pressures other than the peak value.

Quite apparently, the shock wave form is a pressure plot against time, and the pressure transducer is connected to a recorder that provides the wave form directly or at least permits the same to be determined. The recorder may be of any suitable and commercially available type as, for example, a recording oscilloscope. The recorder may be energized by an external power source as shown in FIGURE 1, and in such event the same power supply may be used to energize the pressure transducer. The shock generator is actuated intermittently, and an actuator device may be employed to initiate each operational cycle of the shock generator, and such actuator can be energized from the same power supply.

In determining the size and density of particles dispersed in a fluid medium, best results are attained where the shock wave is propagated in a sufficiently large region of the mixture such that the properties thereof (e.g., velocity, particle loading, temperature) are uniform. If this condition cannot be realized at a convenient location in a flow circuit, the modified arrangement illustrated in FIGURE 2 may be employed to make the size and density determinations. In this modified structural composition, a conduit 12 providing a passage 13 therein through which the mixture flows is connected by means of a tube 14 having a valve 15 disposed therealong to a casing 10a defining a chamber 11a therein. The tube 14 is equipped with a sampler which is disposed in the flow stream of the conduit 12, and a sample quantity of the mixture is collected by the sampler and is delivered to the chamber 11a through the tube 14. The sampler may be any one of the well known isokinetic samplers used for similar purposes.

A shock generator (which includes a piston reciprocable within the chamber 11a) and pressure transducer are associated with the chamber 11a and a recorder, power supply and actuator are operatively arranged with the pressure transducer and shock generator. All such components perform the same function as the respectively corresponding elements described with respect to the structure of FIGURE 1. A vacuum pump is connected to chamber 11a to permit evacuation thereof whenever necessary, as in purging the chamber between samples or, with certain sampler devices, to cause a quantity of the mixture to flow into the chamber. It will be apparent that the valve 15 is closed whenever it is desired to isolate the chamber 11a from the flow passage 13. Quite evidently, the casing 10a must have a closure (not shown) at its upper end to permit evacuation of the chamber.

Typical shock generators are illustrated in FIGURES 3 and 4—the first of which develops a shock wave of electrical origin, and the second of which develops a shock wave of mechanical origin. In the electrical instance, a sparking device 16 (which may be a spark plug used with automobile and other internal combustion engines) is threadedly secured to the casing 10b so that its terminals are disposed within the chamber 11b. In the circuit shown with the sparking device, the casing 10b is grounded, as is the negative terminal of the sparking device, and the positive terminal thereof is connected to ground through the secondary winding of a transformer 17. One side of the primary winding of the transformer is grounded, and the other side thereof is connected to the power supply through a switch 18 which may be cyclically or intermittently actuated as by a rotatable cam 19 driven by a motor 20. Thus, the switch 18, cam 19, and motor 20 constitute an actuator for the shock generator which includes as components thereof the sparking device 16 and energizing transformer 17.

The sparking device shown in FIGURE 3 is useful where the mixture within the chamber 11b is a nonexplosive gaseous medium having either solid or liquid particles dispersed therein. However, the shock wave generated by the sparking device has a somewhat sawtoothed form which rises rapidly to a peak value and falls off quite sharply. Such a shock wave is not as convenient to work with as one that rises more gradually, such as is produced by the mechanical shock wave generator shown in FIGURE 4. In this latter structure, the chamber 11c of the casing 10c is separated by a metal diaphragm (which could be the wall of the casing 10c) from a cylinder 21 defined by a cylinder casing 22. The casing 22 also defines a cylinder 23 which is separated from the cylinder 21 by a partition 24.

Respectively reciprocable within the cylinders 21 and 23 are a pair of pistons 25 and 26 that move in mechanically enforced synchronism because they are rigidly related by a rod 27 that slidably extends through an opening provided therefor in the partition 24. Reciprocable movement of the piston 25 toward the casing 10c and chamber 11c therein transmits a shock wave to any mixture within the chamber by striking or impact with the diaphragm 21a. The reciprocatory cycle of the piston 25 is energized by pressure fluid (compressed air, for example) which is cyclically or intermittently supplied through a control structure 28. The control structure 28 includes a solenoid 29 that is energized through a switch 30 connected to the power supply. The switch is cyclically or intermittently actuated by a rotatable cam 31 driven by a motor 32.

The solenoid is equipped with an elongated reciprocable plunger 33 that extends outwardly from the solenoid and is equipped with a plurality of axially spaced pistons 34, 35 and 36. The plunger 33 is spring biased toward the left (as viewed in FIGURE 4) by a helical spring 37; but when the solenoid 29 is energized, the plunger 33 is displaced toward the right against the biasing force of the spring. In the relative position of the components shown in FIGURE 4, the solenoid 29 has just been deenergized, the plunger 33 has been displaced to its neutral position by the spring 37, but the pistons 25 and 26 have not as yet been returned to their initial positions. In this configuration of the parts, actuating fluid is being delivered through an inlet conduit 38 to an annular chamber defined between the pistons 35 and 36, and flows from such chamber through a conduit 39 to the end portion of the cylinder 23 that is adjacent the partition 24.

Such pressure fluid will be effective to displace the pistons 25 and 26 toward the right within their respective cylinders, and displacement in that direction will not be opposed because the outer end portion of the cylinder 23 is vented to atmosphere through a port 40, and the cylinder 21 at its corresponding end is vented to atmosphere through a conduit 41 that communicates with an annular chamber defined between the pistons 34 and 35 and which is being exhausted to atmosphere through a vent 42. When the solenoid 29 is energized, the inlet conduit 38 will be in communication with the annular chamber defined between the pistons 34 and 35, and pressure will flow from such chamber, through the conduit 41 and into the cylinder 21, where it will displace the piston 25 toward the left and into the position shown in the drawing. At the time, the end portion of the cylinder 23 adjacent the partition 24 will be vented to atmosphere through the conduit 39, annular chamber defined between the pistons 35 and 36, and vent opening 43 communicating therewith.

The opposite end portions of the plunger 33 are appropriately maintained at atmospheric pressure so that reciprocatory movement thereof is not inhibited, and the annular chamber defined about the spring 37 is also substantially at atmospheric pressure because of the relatively loose fit of the plunger 33 within the surrounding wall elements of the solenoid. However, metal-to-metal abutments or impacts of the plunger with its surrounding casing components, and of the pistons 25 and 26 with their surrounding casing components, are prevented by positive air cushions which are developed because of the placement of the various exhaust connections thereto.

The shock waves propagated as a result of the structures shown in FIGURES 1, 3 and 4 are of generally spherical character since, in each case, the pressure wave originates from what may be taken to be a point source. In the structure shown in FIGURE 2, however, the wave front propagated longitudinally through the chamber 11a is substantially planar since it is developed transversely across the entire chamber as a consequence of the reciprocatory displacement of the piston therein. That is to say, each time the shock generator is actuated, a charge of pressure fluid is forced into the chamber 11a beneath the piston and displaces the same upwardly. Quite evidently then, the pressure wave is of planar form because the diameter of the piston is substantially the same as the inner diameter of the conduit 10a. The shock generator will be provided with means for exhausting the lower end portion of the chamber 11a to permit the piston to be returned to the position thereof illustrated in FIGURE 2 under the influence of gravity.

Figure 5:
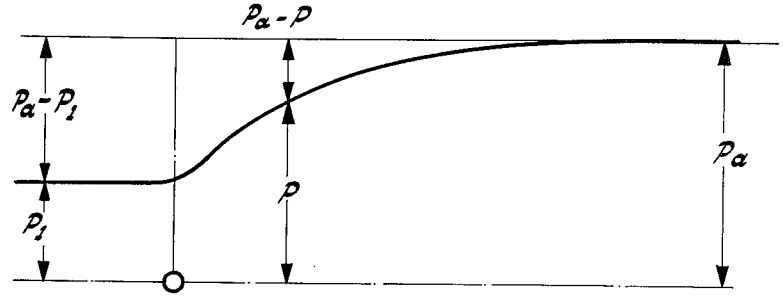
FIGURES 5 and 6 illustrate wave forms of a planar shock wave propagated in a gaseous medium containing solid particles—the first being a continuous wave form developed from a relatively weak shock, and the second being a discontinuous wave form generated from a relatively strong shock.
Figure 6:
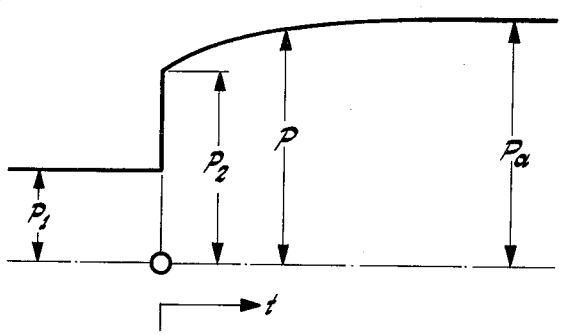

The wave forms resulting from generally planar pressure waves or shock waves are more convenient to work with than those of generally spherical form. Exemplary shock wave forms resulting from planar wave fronts are shown in FIGURES 5 and 6. The wave form of FIGURE 5 results from the transmission of a relatively weak pressure or shock to one of the chambers 11 and propagation in a mixture therein, and a shock of such character may be employed where the concentration of solids is not too great, and may be used to determine either the mass mean diameter of particles dispersed in a fluid medium or the density of such particles therein. The wave form illustrated in FIGURE 6 results from the transmission of a relatively strong pressure or shock to one of the chambers 11 and propagation in a mixture therein, and a shock of this character is used where it is necessary to determine both the mass mean diameter and the density of the particles dispersed in a fluid medium. A strong shock wave is one in which the wave form thereof is discontinuous and is caused by the propagation velocity of the shock wave in the mixture exceeding the speed of sound in air. Each of the wave forms is determined by plotting pressure P against time $t$, and in the drawings, $P_1$ is the initial or normal pressure sensed by the pressure transducer, $P_2$ (FIGURE 6) is the value of the pressure just after the interruption in the wave form caused by a strong pressure shock, and $P_a$ is the peak value.

The function of the various forms of the apparatus is evident from the foregoing discussion, and may be summarized by stating that with a mixture flowing through the chamber 11 (or, with the structure of FIGURE 2, flowing through or contained within the chamber 11$a$), the shock generator is actuated so as to transmit a shock wave to the interior of the chamber where it is propagated in the mixture present therein. Certain characteristics of the propagated shock wave are measured or established so as to provide a basis for determining one or more unknown values of the mixture. In the apparatus disclosed, such unknown values are size and/or amount of particles dispersed in a fluid medium, and the characteristic of the shock wave that is established is the pressure-versus-time wave form thereof; and this is accomplished by measuring one or more pressure values of the shock wave at respectively corresponding measured or known times.

Such measurement is made at a distance from the shock generator whereat the pressure wave form can be determined with relatively good accuracy, and usually such distance will be at a situs at which the wave form at least approximates a steady-state. The distance in numerical terms depends upon several factors—such as the size of the particles dispersed in the fluid medium, and also the mass and density thereof. The distance increases generally with the square of the particle size (that is, diameter). Also, as the pressure ratio $P_a/P_1$ of the shock wave is increased, the thickness (that is, the length along the time axis) of the wave decreases; and therefore, the distance between the shock generator and pressure transducer may be decreased. If a pressure transducer of predetermined characteristics must be employed, the shock wave can usually be made weak enough so that it is sufficiently thick to enable measuring the requisite pressure-versus-time wave form. Where a shock wave of generally planar form is employed, as in the structure of FIGURE 2, the distance between the shock generator and pressure transducer can be increased within any reasonable limits in excess of the requisite minimum distance because the wave form does not fall off as the pressure wave is propagated in the mixture.

As a specific example: With a mixture of air at standard conditions and 3-micron diameter glass beads, the mixture having substantially equal weights of particles and air in a given volume, and with a shock wave strength $$\frac{P_a-P_1}{P_1}=0.01$$

the time required for the pressure rise is approximately 0.22 millisecond when $$\frac{P_a-P}{P_a-P_1}=0.368$$

and the thickness X of the wave is then about four inches. In this event, best results are obtained where the distance between the shock generator and pressure transducer is several times such thickness or at leat about one foot.

Proceeding now with a discussion of the theoretical aspects, it may be said that the invention involves the development of a shock wave, propagating the same in a mixture comprising a fluid medium and a dispersion of particles therein, measuring or establishing certain characteristics of the propagated shock wave from which the size and/or density of such particles may be determined. The measured characteristics could be the rate of attenuation of the shock wave with distance, as in the case of a slurry mixture of liquid and solids (for example, where coal in powdered form is transported in a water carrier, or other mixtures of solids and liquid as in minerals refining, paper pulp, etc.); or the pressure wave form as in determining the size and/or density of particulate matter in the exhaust of rocket engines, in the flow of gases through smokestacks, etc.

Considering this last exemplification in greater detail, if a shock wave is propagated a sufficient distance through a mixture of a fluid and particles dispersed therein, the size and density of such particles can be determined from the pressure-versus-time wave form of the shock wave since the wave form at such distance will be dependent only upon these properties. If the original shock is sufficiently strong, the wave will travel through the mixture at a speed greater than the speed of sound $c$ in the fluid phase of the mixture. In such case, the wave form will have the general appearance shown in FIGURE 6, and it constitutes a nearly discontinuous pressure step $P_2-P_1$ (which is not affected appreciably by the particles) followed by a continuous rise $P_a-P_2$ in the pressure as the particles return to velocity and temperature equilibrium with the fluid.

The pressure ratio $P_2-P_1/P_a-P_2$ depends only upon the magnitude of the discontinuous pressure step $$\frac{P_2-P_1}{P_1}$$

the loading $m$ which is the ratio by weight $R_p/R_g$ of the particles and fluid in a given volume of the mixture and the ratio of the specific heats of the particulate material and fluid (at constant pressure) $C_p/C_{pg}$. Therefore, with the specific heat ratio known, the loading $m$ can be determined by measuring only $P_2-P_1/P_1$ and $P_a-P_2/P_2-P_1$.

It can be shown by dimensional analysis that the thickness X of the shock wave is a function only of the following dimensionless variables when the particle size $r_p$ is essentially uniform $$\frac{R_{g1}c_1X}{u_g}=\left(\frac{P_2}{P_1},\frac{R_s}{R_{g1}},\frac{C_p}{C_{pg}},m,\frac{R_{g1}c_ir_p}{u_g},\frac{k_\alpha}{C_{pg}},V_g\right)$$

Therefore, if the density $R_s$ of the solid particulate material and $R_{g1}$ of the fluid, the fluid viscosity $u_g$, the gas conductivity $k_g$, the ratio of specific heats of the fluid at constant pressure and at constant volume $$V_g=\frac{C_{pg}}{C_{vg}}$$

and of the particles and fluid $C_p/C_{pg}$, and the speed of sound $c_1$ in the fluid are known; then the particle radius $r_p$ can be found by measuring X in addition to $P_2-P_1/P_1$ and $P_a-P_2/P_2-P_1$. If the particles are not spherical in shape, $r_p$ is the radius of the equivalent sphere having the same weight-to-drag ratio. If the particle size is not uniform, the distribution can be determined by a harmonic analysis of the pressure-versus-time wave form which is a function of the expression:

$$\frac{r_\tau t}{R_{g1}r_p^2}=\left(\frac{P}{P_1},\frac{P_2}{P_1},\frac{R_s}{R_{g1}},\frac{C_p}{C_{pg}},\frac{C_p}{C_{pg}},\frac{R_2c_1r_m}{u_g},\frac{k_\tau}{C_{pg}u_g},\frac{C_{p\tau}}{C_{vg}},S\right)$$

where $r_m$ is the mass mean particle radius, S is the standard deviation of the particle size distribution and P is the pressure at time $t$.

If the original shock wave is sufficiently weak, the shock wave will travel through the mixture at a speed less than the speed of sound in the fluid phase, and there will be no initial discontinuity of the wave form (as shown in FIGURE 5). In this case, the shock wave form is approximately exponential and the thickness increases (1) Proportionally with the particle size squared ($r_p^2$), (2) Inversely proportionally with the shock strength $(P_a - P_2/P_1)$, and (3) With increasing loading $m$.

If the velocity of the flowing mixture is low compared with the speed of sound, then there is little diffraction of the shock wave from the stream boundary layer or velocity distribution. Since the thickness of the shock wave is many inches for typical conditions, the diffraction of the shock wave by its own wall boundary layer is negligible.

With respect to the strength of the shock waves, the pressure ratios for a strong shock wave are $$\frac{P_2}{P_1} = \frac{2V_g M_1^2 - V_g + 1}{V_g + 1}$$

and $$\frac{P_a}{P_1} = \frac{2\overline{V} \overline{M}_1^2 - \overline{V} + 1}{\overline{V} + 1}$$

where $U_1$ = propagation velocity of the shock wave, $M_1 = \dfrac{U_1}{c_1}$ = Mach number of the shock wave based upon the speed of sound in the fluid, $\overline{M}_1 = \dfrac{U_1}{\overline{c}_1}$ = Mach number of the shock wave based upon the speed of sound in the mixture, and $\overline{V} = V_g \dfrac{n+1}{nV_g + 1}$ = ratio of specific heats of the mixture at constant pressure and at constant volume.

Consequently, $$M_1^2 = \frac{(V_g + 1)\frac{P_2}{P_1} + V_g - 1}{2V_g}$$

and $$\overline{M}_1^2 = \frac{(\overline{V} + 1)\frac{P_a}{P_1} + \overline{V} - 1}{2\overline{V}}$$

since Equation 1:

$$\frac{\overline{M}_1^2}{M_1^2} = \frac{c_1^2}{\overline{c}_1^2} = \frac{(m+1)(nV_g + 1)}{n+1}$$

where $$m = R_s/R_g$$

and $$n = R_s C_p / R_g C_{pg}$$

Combination of the last three equations gives $$(nV_g + 1)\left(n\frac{C_p}{C_s} + 1\right)\left(\frac{P_2}{P_1} + \frac{V_g - 1}{V_g + 1}\right) - \frac{2nV_g}{V_g + 1}\frac{P_a}{P_1} = \frac{P_a}{P_1} + \frac{V_g - 1}{V_g}$$

The critical pressure ratio $P_{a_c}/P_1$ which divides weak and strong shock waves can be found as follows. For the critical ratio, the initial pressure step $P_2 - P_1$ is infinitesimally small and $M_1 = 1$. For this condition, the above equation gives Equation 2:

$$\frac{P_{a_c}}{P_1} = \frac{2V_g^2 n(m+1) + 2mV_g + V_g + 1}{2nV_g + V_g + 1}$$

As an example, for glass beads in air $$V_g = 1.4 \text{ and } n = 1.13m$$

Consequently, if $m = 1$ and $n = 1.13$, then $$\frac{P_{a_c}}{P_1} = 3.03$$

Therefore, when the mass ratio $m$ is large, fairly high pressure ratios must be used in order to attain strong shock waves. In this case, it may be more practical to use Equation 1 directly to determine $m$. That is, if $$V_g, \frac{C_p}{C_s} \text{ and } c_1$$

are known, $m$ can be found from Equation 1 by measuring $\overline{c}_1$. The speed of sound in the mixture $\overline{c}_1$ can be measured either with a single weak shock wave or with an oscillating pressure of low frequency. In the latter case, the wave length is preferably at least as great as X. As the frequency increases, $\overline{c}_1$ approaches $c_1$; however, the actual value of $\overline{c}_1$ at intermediate frequencies can be found by calibration tests.

Consequently, in determining particle size, loading, or both (in view of the foregoing analysis and the aforementioned known constants), one of several procedures may be followed. First, in all cases, a procedure involving observation may be employed in which tests are run with various known values of particle size distribution and loading, and shock wave forms are recorded as a function of these two variables. On the basis of these records, the two variables can be determined in any case (when they are not known) by measuring a shock wave form and comparing the same to the test records.

Second, the shock wave form may be predicted analytically, as by use of conventional automatic computing machines; and such procedure is employed to greatest advantage with generally planar shock waves propagated in a relatively long, straight section of a duct with the pressure transducer located a sufficient distance from the shock generator to record the steady-state wave form of the propagated shock wave. Third, solution by formula may be employed, which is often convenient where a relatively weak shock wave of generally planar form is used, where the size of the dispersed particles is relatively small and uniform, and where the dispersion is fairly uniform.

As a specific example of solution by formula, the following may be considered: If either the loading $m$ or particle size $d$ is known, the other can be found by generating a single, weak, normal shock wave (or sound wave) and measuring its wave form (pressure versus time) after it has traveled some distance through the mixture. For a weak shock wave, P versus $t$ (the actual time) is nearly exponential, as shown in FIGURE 5. That is, $$\ln \frac{P_a - P}{P_a - P_1} = -\left(1 - \frac{P_1}{P_a}\right)\frac{T}{B}$$

where the dimensionless time $$T = \frac{18 u_g t}{R_s d^2}$$

$d$ = particle diameter = $2r_p$ $$B = \frac{2V_g\left(1 - \frac{n+1}{nV_g + 1} + \frac{n+1}{m+1}Km\right)}{KV_g(2n+1) + K}$$

$$K = \frac{2k_g}{3C_s u_g}$$

$\ln = \log_e$

For 3-micron diameter glass beads in air at standard conditions $$T = 14.3t$$

(where $t$ is in milliseconds).

The dimensionless parameter B depends upon (1) The gas viscosity, conductivity, and specific heats, (2) The specific heat of the particulate material, and (3) The mass-flow ratio $m$.

For glass beads in air at standard conditions, the values of B and $c/\bar{c}$ are tabulated below versus $m$:

| $m$ | B | $c/\bar{c}$ |
|---|---|---|
| 0 | 0 | 1.00 |
| 0.1 | 0.149 | 1.07 |
| .2 | .261 | 1.14 |
| .5 | .474 | 1.31 |
| 1.0 | .638 | 1.56 |

The ratio $c/\bar{c}$ is the speed of a sound wave in air (approximately 1100 ft./sec.) over that in the mixture of glass beads in air. The thickness of the shock wave X is equal to $\bar{c}t$.

From the above results, it can be seen that the shock wave form (P vs. $t$) depends only upon $m$, $d$, and $P_1/P_a$ if the properties of the mixture materials are specified (in this case, for glass beads suspended in air). Therefore, if a shock wave is generated and $P_1/P_a$ and P versus $t$ are measured, then either $m$ or $d$ can be determined if the other is known. For example, $$\left(1-\frac{P_1}{P_a}\right)\frac{T_e}{B}=1$$

gives the time required for $(P_a-P)/(P_a-P_1)$ to decrease from unity to $1/e=0.368$. For 3-micron diameter glass beads in air and for $$\left(1-\frac{P_1}{P_a}\right)=0.01$$

then $$\left(1-\frac{P_1}{P_a}\right)\frac{T_e}{B}=\frac{0.143 t_e}{B}$$

and the actual time ($t_e$ when $(P_a-P)/(P_a-P_1)=0.368$) is tabulated below versus $m$. Consequently, $m$ can be found from the measured value of $t_e$.

| $m$ | $t_e$ (milliseconds) |
|---|---|
| 0.1 | 0.96 |
| .2 | .55 |
| .5 | .30 |
| 1.0 | .22 |

On the other hand, if $m$ is known, the particle size $d$ (proportional to the square root of $t_e$) can be found from the measured value of $t_e$. Note that the thickness of the shock wave (and the value of $t_e$) can be shifted to a convenient experimental range by adjustment of the shock strength $$\left(1-\frac{P_1}{P_a}\right)$$

If both $m$ and $d$ must be found, this can be done by generating a strong shock wave in the mixture which travels faster than the speed of sound in air, [$(c/\bar{c}$ less than 1)]. In this case, there is an initial discontinuous step in the wave form as shown in FIGURE 6. The value of $m$ can be determined (independent of $d$) from the measured values of $P_2/P_a$ and $P_2/P_1$.

The size of the particles $d$ then can be found from the measured time for the pressure to rise from $P_2$ to $P_a$, as described previously. For strong shock waves there is no simple analytical expression for P versus $t$, however, and the wave form can be found by use of automatic computing techniques. In this way, P versus $t$ can be computed for specified material properties, mass-flow ratio $m$, and particle size distribution (rather than a single value of $d$). By comparison of a measured wave form with those computed for various size distributions (and values of $m$), the particle size distribution and $m$ can be determined experimentally for any particle-laden gas.

From the foregoing it is evident that the invention involves the development and propagation of a shock wave in a mixture comprising a fluid and particulate material, and the measurement of one or more predetermined characteristics of the propagated shock wave as a basis for determining the size and density of the particulate material in the mixture. Such procedure is advantageously used because it requires no sampling of a fluid flow stream (although portions of the flow stream may be withdrawn therefrom for test purposes) and the measurements are accomplished with minimum disturbance thereto, it is highly susceptible to continuous monitoring of a flow stream and process control therefor, and the structural embodiments of the invention can be provided as a simple, rugged, portable and relatively inexpensive instrument.

While in the foregoing specification embodiments of the invention have been set forth in considerable detail for purposes of making an adequate disclosure thereof, it will be apparent to those skilled in the art that numerous changes may be made in such details without departing from the spirit and principles of the invention.

I claim:
1. A method for quantitatively determining the loading of a fluid carrying particulate material where said loading is the ratio of the weight of said particulate material to the weight of said fluid for a given volume of mixture or for determining the mean particle radius of said particulate material or both comprising the steps of:
   (a) developing a single shock wave within a first portion of said fluid carrying said particulate material;
   (b) measuring at a second portion of said fluid carrying said particulate material the geometric configuration of a measured wave shape of the pressure built up due to the generation of said single shock wave against time;
   (c) generating a plurality of pressure versus time wave shapes, each of which is derived from a particular combination of loadings and mean particle sizes for particular materials and fluids;
   (d) storing said plurality of wave shapes to provide a dictionary of stored wave shapes;
   (e) comparing said geometric configuration of said measured wave shape against said stored wave shapes to make the aforesaid determination.

2. A method for determining the loading of a fluid carrying particulate material where said loading is the ratio of the weight of said particulate material to the weight of said fluid for a given volume of mixture comprising the steps of:
   (a) developing a single shock wave at a first portion of said fluid carrying said particulate material;
   (b) and measuring within a second portion of said fluid carrying said particulate material the increase in pressure just as said single shock wave arrives at said second portion of said fluid carrying said particulate material and also measuring the maximum peak pressure produced by said single shock wave within said second portion.

3. A method for determining the mean particle radius of particulate material carried within a fluid comprising the steps of:
   (a) developing a single shock wave within a first portion of said fluid carrying said particulate material; and
   (b) measuring within a second portion of said fluid carrying said particulate material the time between the instant of arrival of said single shock wave at said second portion of said fluid and the instant in which peak pressure due to said single shock wave is manifested in said second portion.

References Cited by the Examiner

UNITED STATES PATENTS

| | | | |
|---|---|---|---|
| 2,539,418 | 1/1951 | Grogan | 73—12 X |
| 2,768,524 | 10/1956 | Beard | 73—53 |
| 2,946,217 | 7/1960 | Fruengel | 73—67.5 |
| 3,093,998 | 6/1963 | Albertson et al. | 73—61 |

FOREIGN PATENTS 1,197,130  6/1959  France.

OTHER REFERENCES

Magamatsu et al.: "Hypersonic Shock Tunnel," ARS Journal, May 1959, pages 332–340; pages 335, 336 relied on.

Cadle: "Particle Size Determination," Interscience Pub. Inc., New York, 1955.

LOUIS R. PRINCE, *Primary Examiner.*

DAVID SCHONBERG, RICHARD QUEISSER,
*Examiners.*